United States Patent [19]

Someya et al.

[11] 4,376,575
[45] Mar. 15, 1983

[54] SINGLE LENS REFLEX CAMERAS AND VIEWFINDER DISPLAY SWITCHOVER DEVICES THEREFOR

[75] Inventors: Hiromi Someya, Kawasaki; Kikuo Momiyama, Yokohama, both of Japan

[73] Assignee: Canon Kabushiki Kaisha, Tokyo, Japan

[21] Appl. No.: 319,068

[22] Filed: Nov. 6, 1981

[30] Foreign Application Priority Data

Dec. 26, 1980 [JP] Japan .................. 55-187747[U]

[51] Int. Cl.³ .................. G03B 13/02; G03B 17/20
[52] U.S. Cl. .................. 354/155; 354/225; 354/289
[58] Field of Search ............... 354/53, 155, 219, 224, 354/225, 289

[56] References Cited

U.S. PATENT DOCUMENTS 4,053,912 10/1977 Okuno et al. .................. 354/155
4,118,723 10/1978 Yamazaki et al. ............... 354/155
4,295,723 10/1981 Momiyama et al. ............ 354/155

Primary Examiner—L. T. Hix
Assistant Examiner—Alan Mathews
Attorney, Agent, or Firm—Toren, McGeady and Stanger

[57] ABSTRACT

The disclosed single lens reflex camera includes a shutter dial and a pentaprism as well as an eyepiece, and forms an image of a scene in the camera's field of view and a data image near the scene image through the eyepiece by passing data light from the vicinity of the pentaprism into the interior of the pentaprism. A display switchover device includes a transmission arrangement on the shutter dial for transmitting the motion of the dial, a linkage arrangement engageable with the transmission arrangement to be actuated on the basis of the selected position of the shutter dial, and a display selector between the pentaprism and the eyepiece and actuated by the linkage arrangement to control the direction of the data light to the eyepiece. According to an embodiment, the selector includes a subprism having a surface from which the data light from the pentaprism is reflected and another surface for directing the data light to the eyepiece, and a reflector that faces the two subprism surfaces for changing the reflecting position in response to the linkage arrangement.

10 Claims, 9 Drawing Figures

SINGLE LENS REFLEX CAMERAS AND VIEWFINDER DISPLAY SWITCHOVER DEVICES THEREFOR

BACKGROUND OF THE INVENTION

1. Field of the Invention

This invention relates to single lens reflex cameras and viewfinders for single lens reflex cameras in which data images are displayed with the image of a scene by passing data light into the camera's pentaprism, and more particularly to display changing devices for such viewfinders.

2. Description of the Prior Art

In general, automatic exposure cameras may operate in one of two modes, namely a shutter time priority mode or an aperture priority mode. In so-called dual priority cameras, operable in either one of these modes, the display of exposure information in the camera's viewfinder must be switched depending upon the selected exposure mode. That is, in the shutter time priority mode, it is necessary to display the preset value of the shutter time and an aperture value computed on the basis of the object brightness. Conversely, in the aperture priority exposure mode, the viewfinder must display the preset aperture value and the shutter time computed on the basis of the object brightness. However, such data may each be displayed by using a meter with a scale. In the shutter priority mode, the exposure data may be displayed at one side margin of the field of view image. In the aperture priority mode, the exposure data may be displayed in the lower margin of the field of view image. If both exposure data appear simultaneously, the displayed data may be confusing to the photographer. In other words, when the exposure data are to be displayed in such a manner, it is desirable to control the presentation so that one set of data is displayed and the other is extinguished.

Various types of display switchover devices for presenting and cancelling exposure data are known. These may use a changeover mechanism which is actuated by an operating member provided in the camera body for extinguishing the displayed data. However, conventional switchover devices generally involve placing a shutter member in the data light path to make the displayed information disappear, and by operatively connecting the operating member to the shutter by means of wire or other device. Therefore, conventional switchover devices in a finder raise the problem of increasing the size of the finder to allow for space in which the shutter member may move. This complicates the mechanism. Furthermore, because the operative connection between the shutter member and the operating member in such switchover devices must be established with the use of a wire or the like, it cannot be used with interchangeable finders decoupleable from single lens reflex cameras. In prior single lens reflex cameras using interchangeable viewfinders, such display switchover devices had to be located entirely within the camera body, thereby sacrificing the simplicity of the latter.

SUMMARY OF THE INVENTION

With the foregoing in mind, an object of the present invention is to provide a display changeover device for a single lens reflex camera which has achieved the possibility of including a changeover mechanism for extinguishing the display of exposure information in the finder and which even when applied to an interchangeable finder, can change the display depending upon the position of the operating member that is included in the camera body.

DETAILED DESCRIPTION OF THE PREFERRED EMBODIMENTS

The present invention will next be described in greater detail in connection with embodiments thereof by reference to the drawings.

Figure 1:
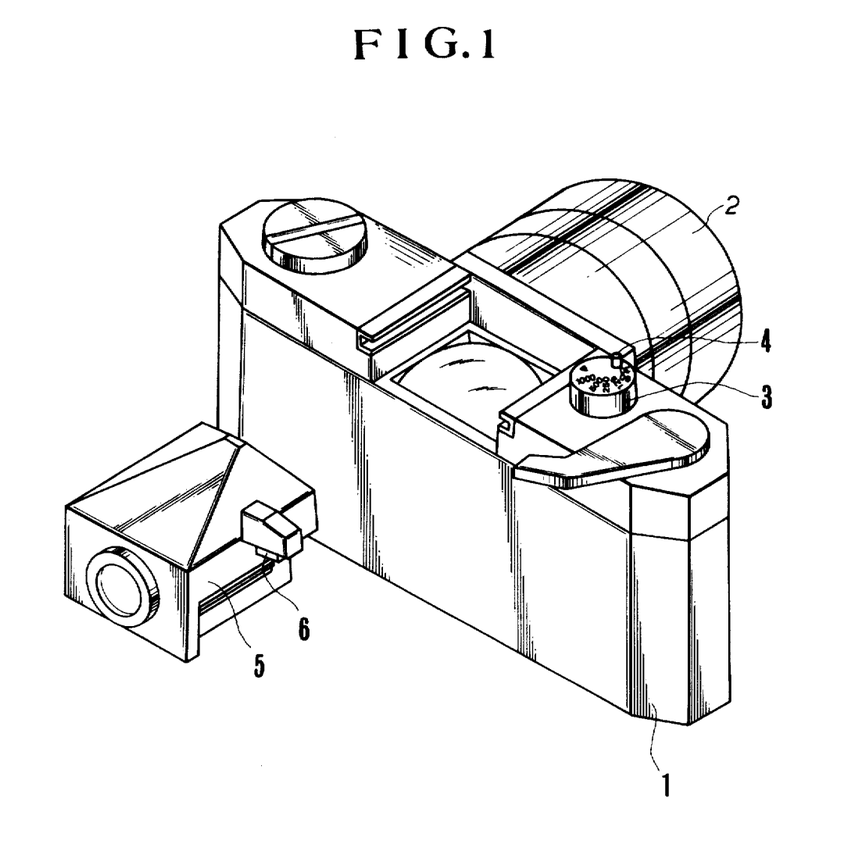
FIG. 1 is a perspective view of an example of application of the display changeover device of the invention to a single lens reflex camera.

In FIG. 1, the camera is composed of a camera body 1, is an objective lens 2, a shutter dial 3 forming part of a shutter time presetting mechanism, an actuator pin 4 mounted on the shutter dial 3, an interchangeable finder 5 for attachment to the camera body 1 and a sensor member 6 to react to the actuator pin 4 when the information display is changed.

Figure 2:
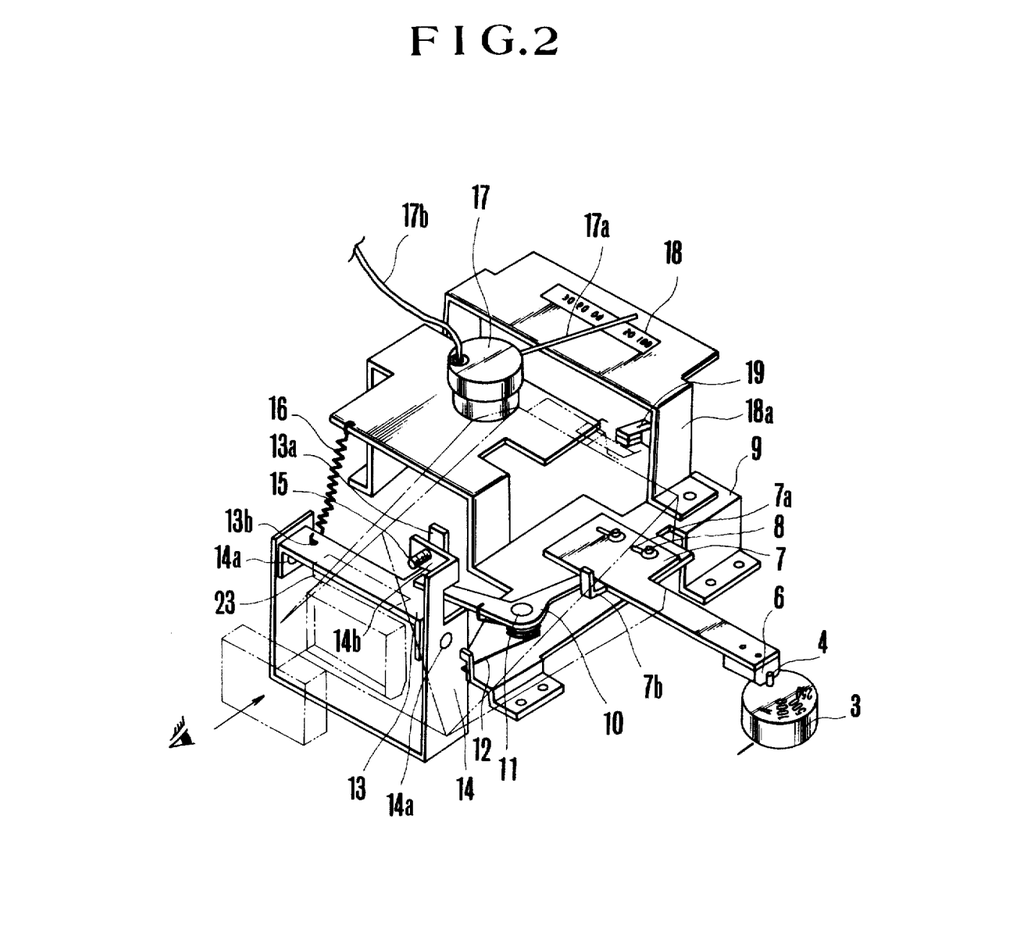
FIG. 2 is a perspective view of one embodiment of a display changeover device according to the present invention.

FIG. 2 illustrates a practical example of the mechanical structure of the interchangeable finder 5 attached to the camera body 1. The shutter dial 3, actuator pin 4 and sensor member 6 are those illustrated in FIG. 1. A slide 7, fixedly carrying the sensor member 6 and having elongated slots 7a which respective pins 8 mounted on a base plate 9 penetrate, is slidably movable on the surface of the base plate 9 and guided by the pins 8.

The slide plate 7 has an extension 7b engaging a lever 10. A lever 10 is pivotally mounted on a pin 11 on the base plate 9. A resilient member 12 (for example, torsion coil spring) urges the lever 10 clockwise. The lever 10 while, on one hand, engaging the extension 7b, on the other hand, engages a radial extension 13a of a rocking member 13 which fixedly carries a flat mirror 23 (see FIGS. 7 and 8). The rocking member 13 is pivotally mounted at stubs 14a on a support member 14. Again the support member 14 has an extension 14b on which is movably mounted an adjusting member (for example, a set screw).

Further provided in the above-described rocking member 13 is a cutout portion 13b at which is connected one end of a resilient member 16 (for example, a coil spring) which urges the rocking member 13 counterclockwise. The opposite end of the resilient member 16 is connected to the base plate 9. A meter 17 receives a lead wire 17b electrically connected through a terminal (not shown) to the camera body. A display member 18 with a shutter time scale rests on supporting legs therefor. An adjusting member 19 for a flat mirror 27 (see FIG. 3) adjusts the angle of the flat mirror 27 to correctly direct data light to a pentaprism 21.

Figure 3:
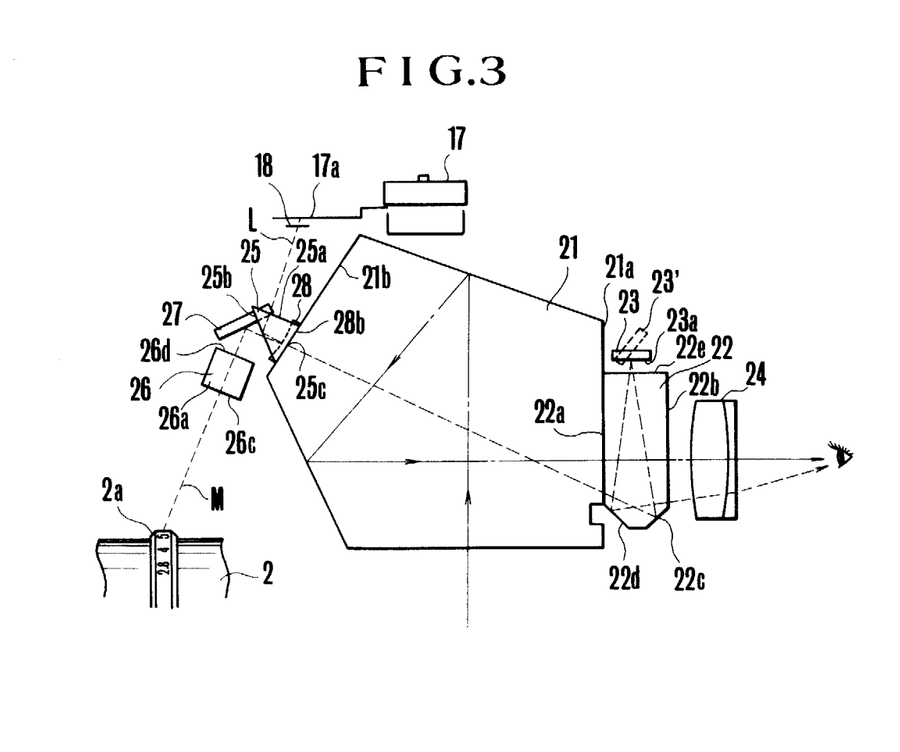
FIG. 3 is a sectional view of the finder optical system in the single lens reflex camera of the invention.
Figure 4:
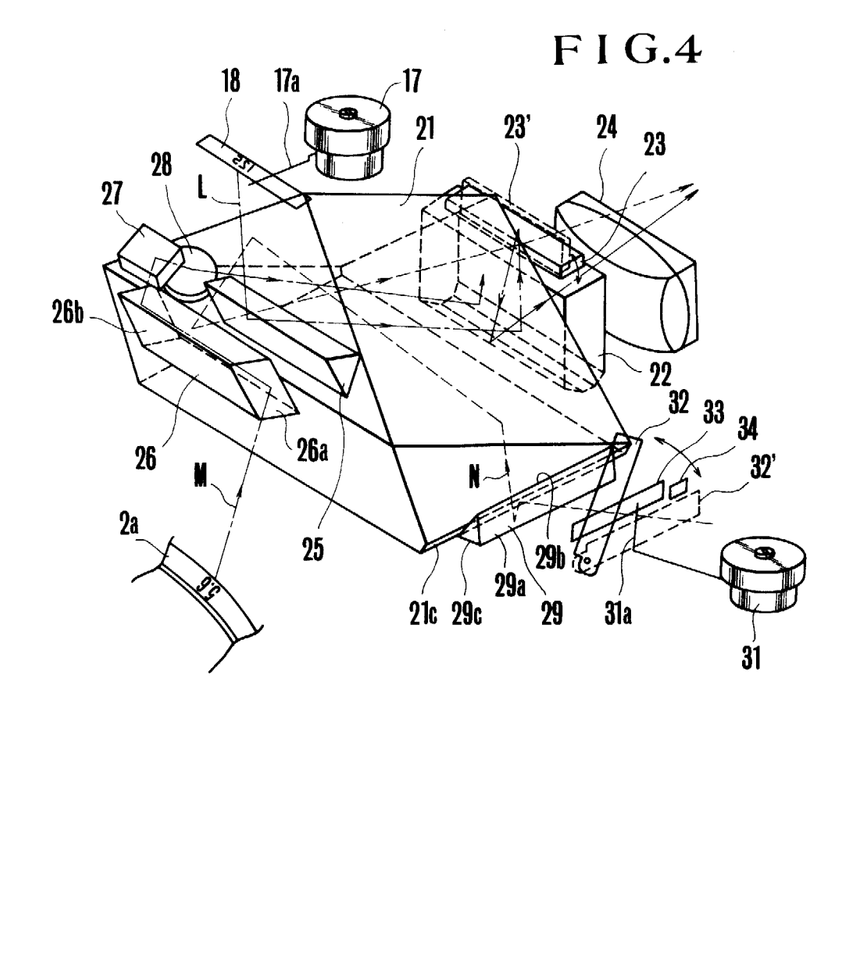
FIG. 4 is a perspective view of the finder optical system of FIG. 3.
Figure 6:
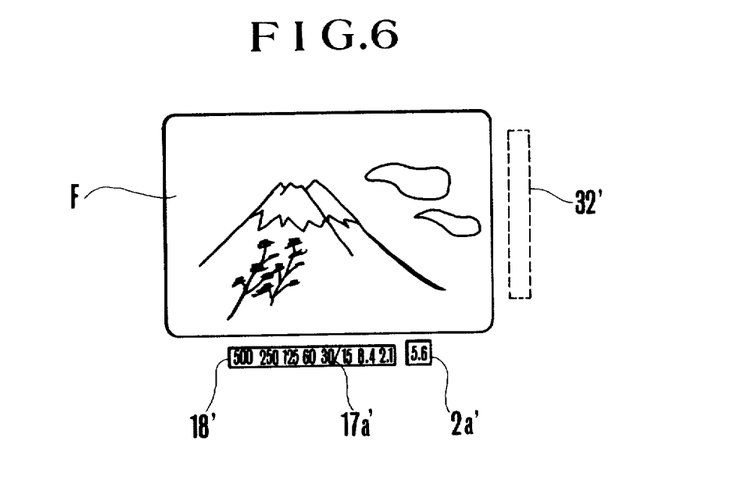

In FIGS. 3 and 4, the pentaprism 21 directs, rays of light radiated from an image of an object to be photographed on a focusing screen (not shown) to a sub-prism 22 and is therefrom directed to an eyepiece 24. The sub-prism 22 has parallel flat permeable surfaces 22a and 22b, downwardly of which are reflection surfaces 22c and 22d, and has an upper permeable surface 22e. And, these reflection surfaces 22c and 22d are mirrored by a reflection coating of, for example, aluminum. The permeable surface 22a is cemented to the rear or exit face 21a of the pentaprism 21. This permeable surface 22a may be otherwise spaced from the exit face 21a a small distance, but the cemented form has the advantage that handling of both the prisms becomes easier. Member 23 is the above-described rockingly mounted flat mirror with its reflection surface 23a mirrored by depositing a reflection coating of aluminum or the like. A triangular prism 25 has permeable surfaces 25a and 25c and a reflection surface 25b. The triangular prism 25 is cemented with its permeable surface 25a to the front upper slant face 21b of the pentaprism 21 at almost the center of the area thereof. Displays 17a and 18 are means for displaying information representing the above-described shutter time, and a warning of whether or not the exposure adjustment is out of range. The information display means 17a and 18 gives off light L which after having passed through the permeable surface 25a of the triangular prism 25 is then reflected by the reflection surface 25b to the permeable surface 25c and from there is directed through the front upper slant face 21b of the penta-prism 21 to the lower margin of the exiting face 21a. After having emerged from this exiting face 21a, the light L enters the sub-prism 22 at the permeable surface 22a and is then reflected from the reflection surface 22c to the permeable surface 22e. After having emerged from this surface 22e, it is reflected by the reflection surface 23a of the flat mirror 23 which is positioned to face at the surface 22e, and then again enters the sub-prism 22 at the surface 22e. After that, it is reflected by the reflection surface 22d to the permeable surface 22b and is therefrom directed to the eye-piece 24. A concave lens 28 has its second surface 28b cemented to the front upper slant face 21b of the pentaprism at the side thereof. The concave lens 28 and the preceding triangular prism 25 are arranged in a row in a direction perpendicular to a plane including an edge line of division of the roof faces of the pentaprism 21, i.e., perpendicular to the paper of FIG. 3. In the illustrated embodiment, a reflection member 27 is in the form of a flat mirror, and a reflection member 26 in the form of a rhombic prism mirror. The rhombic prism 26 has two reflection surfaces 26a and 26b and two permeable surfaces 26c and 26d and is positioned near the front upper slant face 21b of the penta-prism 21 at a location such that one of the reflection surfaces 26a occupies almost the center of the length in the lateral direction. Data 2a on the outer periphery of the barrel of the objective lens 2 is in the illustrated embodiment in the form of an aperture scale on the diaphragm presetting ring. Display information light M from the aperture scale 2a enters the rhombic prism 26 at the permeable surface 26c as shown in FIG. 4 and is then reflected sidewards by one of the reflection surfaces 26a of this prism. After that, the information light M is reflected upwards by the other reflection surface 26b, and exits from the permeable surface 26d of this prism. Then, it is reflected by the reflection surface 27a of the flat mirror 27 to the concave lens 28. After having been refracted by this concave lens 28, it enters at the front upper slant face 21b of the penta-prism 21 and is directed therethrough to the lower margin of the exit face 21a thereof at almost the same angle as the other display information light L. Thus, the information light M emerging from the rear face 21a of the prism 21 travels in a path similar to that of the display information light L before reaching the eye-piece 24. Hence, as shown in FIG. 6, data 2a appear as displayed information 2a', and the data 17a, 18 appear as displayed information 17a', 18' in side-by-side relation in predetermined positions below the image F in the field of view.

In FIG. 3, a phantom outline 23' indicates a turned position of the flat mirror 23. As the flat mirror 23 is turned from the solid line position, the information bearing light beam is deflected so as not to proceed to the reflection surface 22d of the sub-prism 22. Then the display of data 2a' and 17a', 18' is extinguished before the photographer looking through the eye-piece.

Also the above-described pentaprism 21 as shown in FIG. 4 is slanted in one side of the bottom entrance face thereof to form a pearmable surface 21c. A triangular prism 29 has permeable surfaces 29a and 29b and a reflection layer-coated surface 29c and is positioned with its permeable surface 29b opposite to the permeable surface 21c of the pentaprism at a small separation therefrom. Members 33, 34, 31a are information display arrangement such as a shutter scale, diaphragm scale, out-of-range warning, and meter needle. In the illustrated embodiment, 33 is a diaphragm scale; 34 is shutter time; and 31a is a meter needle.

Figure 5:
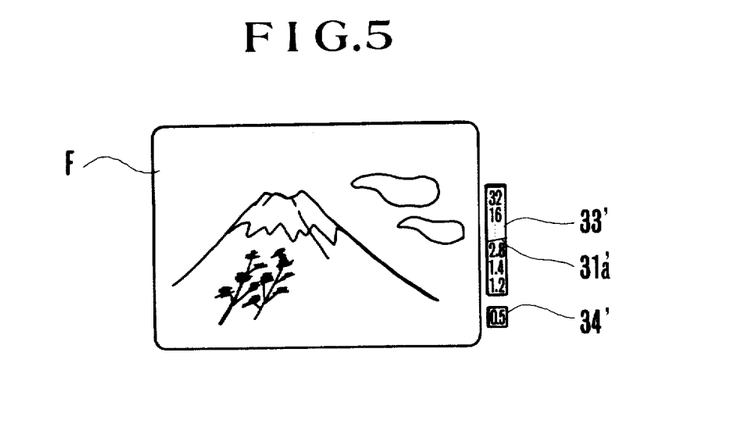
FIGS. 5 and 6 are plan views of a field of view of the finder with respective differing displays of exposure information.

The information display members 33, 34, 31a together give off light N which passes enters the triangular prism 29 through a permeable surface 29a to enter this prism. Then, it is totally reflected by the permeable surface 29b and then once more by the reflecting surface 29c through the permeable surface 29b. After having emerged from that surface 29b, it enters the above-described pentaprism 21 and passes therethrough in a path similar to that in which the finder image forming light passes until it reaches the eye-piece 24. Thus, the light N bearing data to be displayed presents itself as a display of informations 33', 34' and 31a' at the right hand side of the viewfinder image F as shown in FIG. 5. A shutter arrangement 32 cooperates with the shutter dial 3 and, as far as the illustrated embodiment is concerned, upon selection of the aperture priority exposure mode places a symbol "A" on the shutter dial 3 in registry with an index to block the light N as shown by dashed lines in FIG. 6. The members 33, 34 and 31a and the shutter arrangement 32 are included in the interior of the camera body. It is further noted that the operative connection between the shutter arrangement 32 and the shutter dial 3 is known and constructed as follows: The shutter dial 3 fixedly carries a first pulley rotatable along therewith, and the shutter arrangement 32 is provided with an actuator which is driven by a second pulley. The first and second pulleys are constrained by an endless wire to transmit motion of the first pulley to the second one, so that the shutter dial 3 is drivingly connected to the shutter arrangement 32.

The operation of the embodiment of such construction is as follows.

Figure 7:
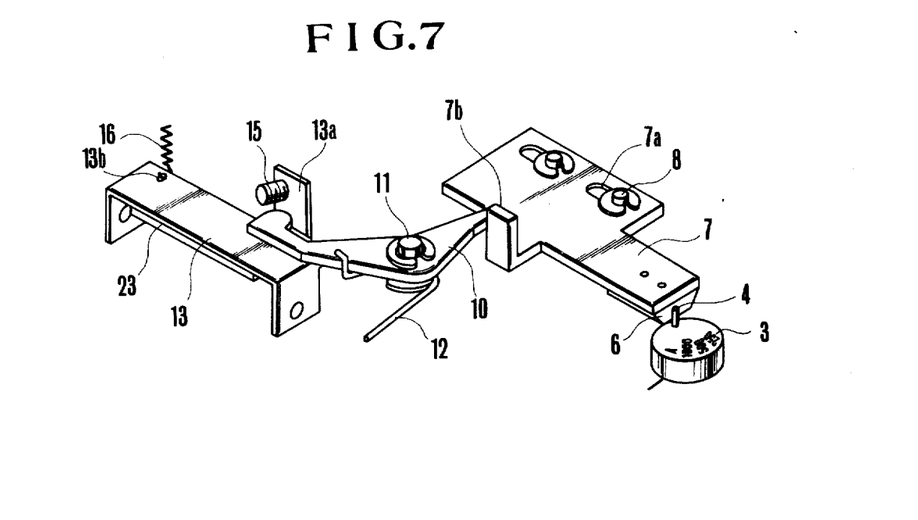
FIGS. 7 and 8 are perspective views of the operative connection of FIG. 2 in two positions.

FIG. 7 illustrates the elements' positions where the display of informations appears below the field of view of the finder as shown in FIG. 6. The shutter dial 3 may be set in a position (in this instance, "A" position) where the camera is switched to the aperture priority exposure mode, and where the actuator pin 4 acts on the sensor member 6. As the slide 7 is moved to the left, the lever 10 is turned counterclockwise against the force of the bias spring 12, so that rocking member 13 its extension engaging with the lever 10 is freed therefrom to turn counterclockwise by the spring member 16. Such movement goes on until the extension 13a abuts the above-described adjusting member 15. Thus, the flat mirror 23 is oriented such that the information light from the reflection surface 22c of sub-prism 22 is returned to the prism at its reflection surface 22d. Therefore, the information light from the reflection surface 22c of sub-prism 22 is directed to the eye-piece 24 when the shutter dial 3 is set in the aperture priority mode position ("A" position), and the information light is recognized within the finder as shown in FIG. 6. Also, at this time, the shutter means 32 blocks the triangular prism 29 from the information light so that the display of exposure information which is significant in the shutter priority exposure mode is not presented. In connection with the adjusting member 15, it need scarcely be said that it is better to carry out an adjusting operation of the member 15 during assembly with the resulting position of the displayed data 2a', 17a' and 18' optimum relative to the field of view of the finder.

Figure 8:
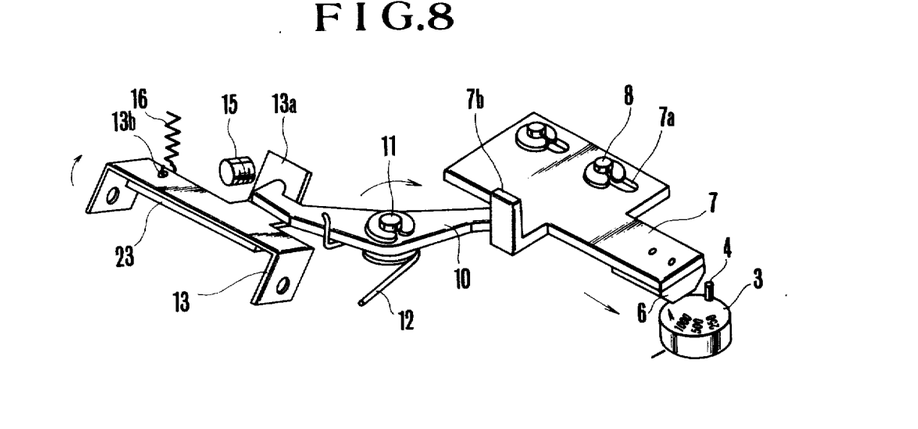

FIG. 8 illustrates another operative position where the shutter dial 3 is turned to move the symbol "A" representing the aperture priority exposure mode out of registry with the index. In this case, the actuator pin 4 is moved away from the sensor 6 to permit clockwise movement of the lever 10 by the spring 12 as the slide 7 moves in the direction reverse of that described in connection with FIG. 7. In this case, the force of the spring 12 which overcomes the force of the spring 16 turns the rocking member 13 clockwise, so the flat mirror 23 is turned to a position where the information light from the reflection surface 22c of sub-prism 22 is not directed to the reflection surface 22d of said prism. Therefore, the display of data 2a', 17a' and 18' which occurs in the aperture priority exposure mode is extinguished from the vicinity of the field of view of the finder. On the other hand, at this time, the shutter arrangement 32 is retracted from the light path to the position shown in FIG. 4 so that when in the shutter priority exposure mode or the manual exposure mode, the display of informations 31a', 33' and 34 is presented.

Figure 9:
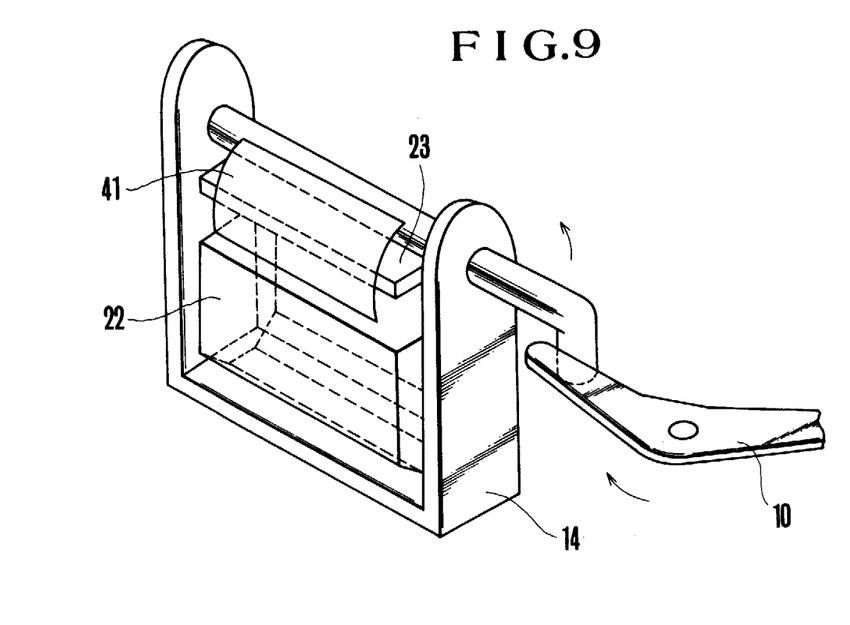
FIG. 9 is a fragmentary perspective view of another embodiment of the invention.

FIG. 9 illustrates another embodiment of the invention where a reversible opaque mask 41 (for example in the form of a thin plate with a light shielding property) is arranged to advance into and be drawn from the light path between the sub-prism 22 and flat mirror 23. This embodiment though capable of reducing ghost as compared with the first embodiment has a problem of requiring additional space.

As described in greater detail above, according to the present invention, setting the shutter dial on the camera suffices either to readily extinguish the display of informations unnecessary to the selected exposure mode, or to present this display as need arises. Further, the device for switching between the presentation and extinction of the display of information can be constructed in a simple form that does not require a very large space, thus avoiding any increase in the bulk and size of the camera and finder. Furthermore, according to the present invention, even interchangeable finder type single lens reflex cameras, the selecting the presentation and extinction of a display data can be achieved with ease. This contributes to a simple operation of the camera.

What is claimed is:

1. A finder display changeover device for a single lens reflex camera having a shutter dial and a pentaprism and an eyepiece, and which forms a viewfinder image of the camera's field of view and a data image near the viewfinder image through the eyepiece by passing data light from the vicinity of the pentaprism into the interior of the pentaprism, comprising:
    (a) transmission means in the shutter dial for transmitting motion of the dial;
    (b) response means in a position engageable with the transmission means to be actuated depending upon the selected position of the shutter dial; and
    (c) display changeover means between the pentaprism and the eyepiece and actuated by the response means to control the direction of the data light to the eyepiece.

2. A device according to claim 1, wherein said display changeover means includes:
    (a) a sub-prism having a first reflecting surface from which data light from the pentaprism is reflected and having a second reflecting surface for directing the data light to the eyepiece; and
    (b) a reflecting member having a reflecting surface which faces the first and second reflecting surface of the sub-prism for changing its reflecting position in response to said response means.

3. A device according to claim 1, wherein the shutter dial is movable into positions for setting a shutter time and a position for setting the camera in the aperture priority exposure mode.

4. A device according to claim 3, wherein the display changeover means are arranged to make it possible to direct the data light to the eyepiece when the shutter dial is moved in the position for the aperture priority exposure mode.

5. A device according to claim 4, wherein the finder display changeover device further includes:
    (a) first light conducting means for passing a preset aperture data light through the pentaprism to the first reflecting surface of the subprism; and
    (b) second light conducting means for passing data light of the shutter time information computer in accordance with the preset aperture information through the pentaprism to the first reflecting surface of the subprism.

6. A viewfinder for a single lens reflex camera, detachable from the single lens reflex camera having a movable shutter dial, comprising:
    a pentaprism and an eyepiece for together forming a viewfinder image of the camera's field of view and a data image near the viewfinder image by passing light from the vicinity of the pentaprism into the interior of the pentaprism;
    transmission means for transmitting the motion of the dial;
    linking means engageable with the transmission means to be actuated depending upon the selected position of the dial; and
    display switching means between the pentaprism and the eyepiece and actuated by the linking means to control the direction of the data light to the eyepiece.

7. A device as in claim 6, wherein said display switchover means includes:

a subprism having a first reflecting surface from which data light from the pentaprism is reflected and having a second reflecting surface for directing the data light to the eyepiece; and a reflecting member having a reflecting surface which faces the first and second reflecting surface of the subprism for changing its reflected position in response to said linking means.

8. A device as in claim 6, wherein said transmission means on the shutter dial is movable into positions representing a shutter priority mode and a position representing an aperture priority mode.

9. A device as in claim 8, wherein said display switchover means are arranged to direct the data light to the eyepiece when the transmission means is moved into the aperture priority exposure mode.

10. A device as in claim 9, wherein the finder display switchover device further includes:

first light conducting means for passing preset aperture data light through the pentaprism to the first receiving surface of the subprism; and second light conducting means for passing shutter data light computed in accordance with the preset aperture data through the pentaprism to the first reflecting surface of the subprism.

* * * * *